June 26, 1956 P. CALVY 2,752,114
FLYING MACHINE FOR TRANSPORT OF FREIGHT
Filed Nov. 18, 1952 5 Sheets-Sheet 1
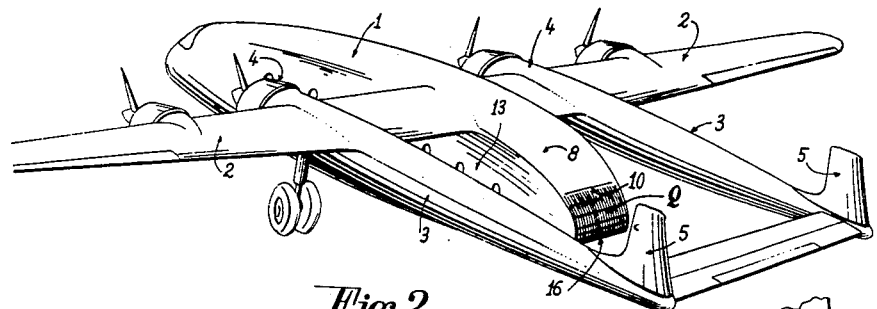
Fig. 1
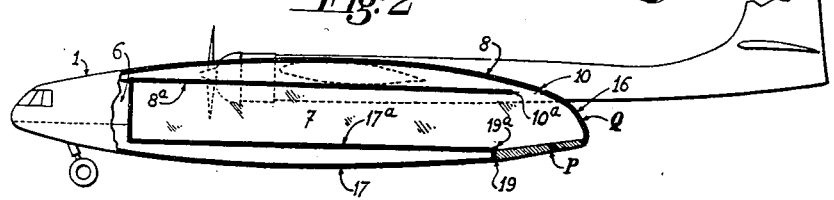
Fig. 2
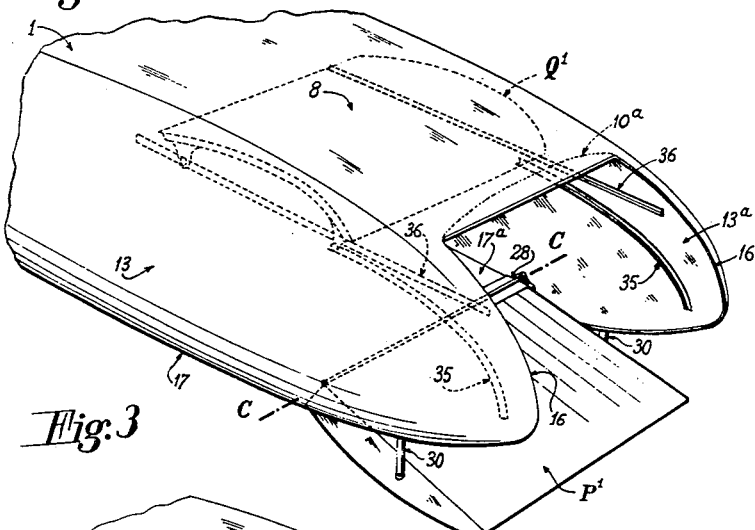
Fig. 4
Fig. 3
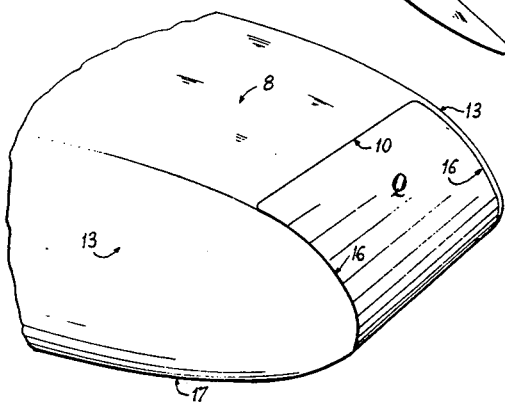
Pierre Calvy
INVENTOR
By Richardson, David and Nordon
his ATTYS.

June 26, 1956 P. CALVY 2,752,114
FLYING MACHINE FOR TRANSPORT OF FREIGHT
Filed Nov. 18, 1952 5 Sheets-Sheet 2
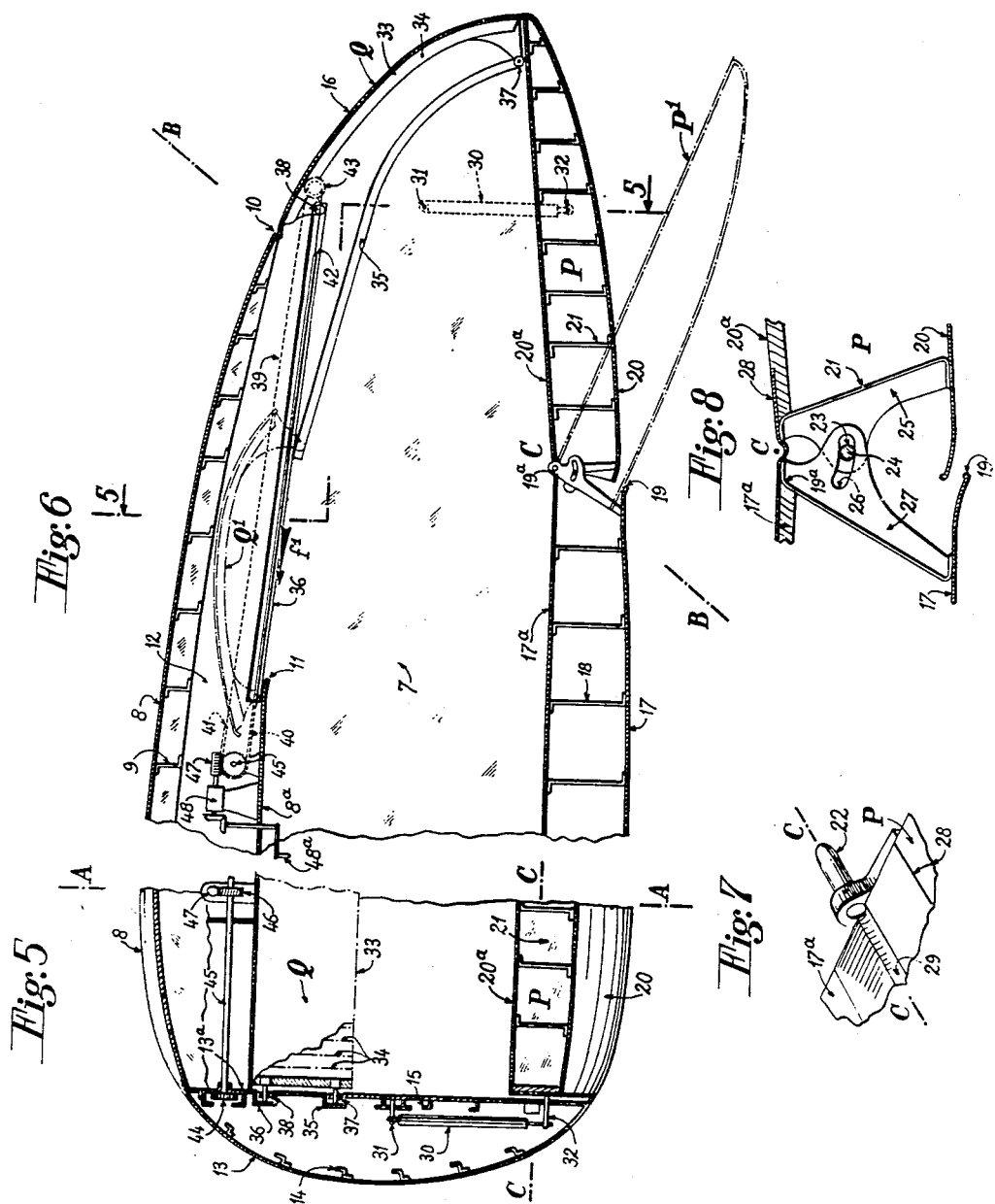
Pierre CALVY
INVENTOR
By Richardson, Davidson Norton
his ATTYS June 26, 1956 P. CALVY 2,752,114
FLYING MACHINE FOR TRANSPORT OF FREIGHT
Filed Nov. 18, 1952 5 Sheets-Sheet 3

Pierre Calvy
INVENTOR

By Richardson, Davis and Norder
his ATTYS

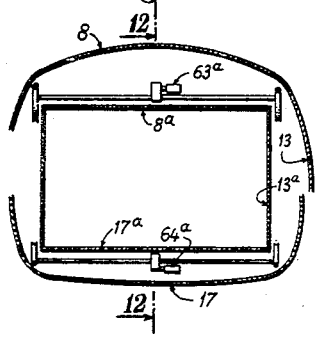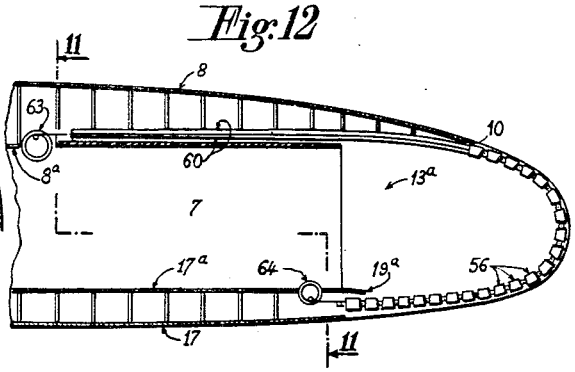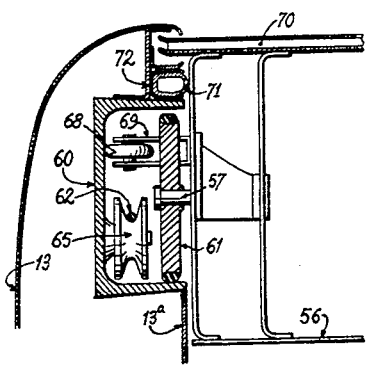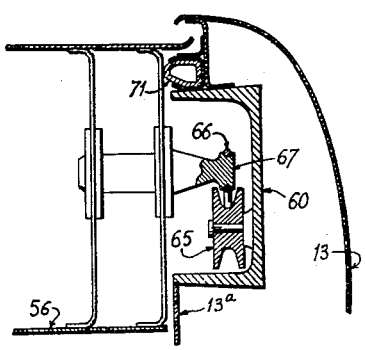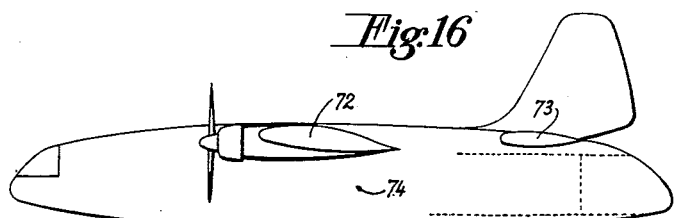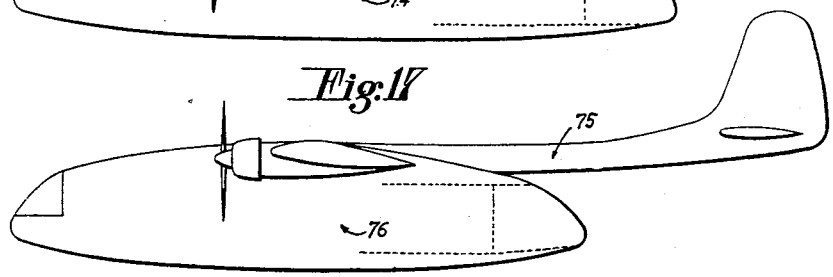

United States Patent Office 2,752,114
Patented June 26, 1956

2,752,114

FLYING MACHINE FOR TRANSPORT OF FREIGHT

Pierre Calvy, Courbevoie, France, assignor to Societe Nationale de Constructions Aeronautiques du Nord, Paris, France, a French body corporate Application November 18, 1952, Serial No. 321,198

Claims priority, application France April 2, 1952

3 Claims. (Cl. 244—118)

The present invention relates to flying machines suitable for the transport and the parachuting of personnel, freight and objects of large size.

It has for object to provide a flying machine with which it is always possible to carry out very rapidly all the missions for which it is constructed without at any time interfering with the aerodynamic or structural characteristics of this machine whatever be the conditions of transshipment of the load on the ground or in flight.

With this machine it is possible in particular to load and unload on the ground one or several objects whose largest width may be substantially equal to the cross section of the hold provided in the fuselage for their reception.

It is also possible to parachute this or these objects without difficulty while in flight. The preceding operations are possible while maintaining the flying and structural characteristics of the machine and an ease of handling in the minimum of time.

The invention has more particularly for object to provide a flying machine in which the fuselage forming a hold comprises at the tail end an opening having a substantially rectangular shape and a clearance area substantially equal to the largest cross-section of the hold. This opening is provided with a closing device having at least one portion in the form of a retractable panel that is mobile between its active closing position and a retracted position within one of the double walls of the structure of this fuselage, in a way that this portion never projects from the fuselage.

Other features will be apparent from the ensuing description.

In this accompanying drawing given solely by way of example:

Fig. 1 is a diagrammatic perspective view of a twin boom aeroplane improved in accordance with the invention.

Fig. 2 is a diagrammatic, vertical, longitudinal section along the centre line of the fuselage thereof.

Fig. 3 is a perspective view of the rear part of the fuselage of this aeroplane, the opening providing access to the hold being closed.

Fig. 4 is a similar perspective view showing the hold open.

Fig. 5 is half a vertical cross-section on line 5—5 of the Fig. 6 of the rear part of this hold including the closing devices for the entrance opening.

Fig. 6 is a corresponding longitudinal section of the rear part of this hold and its closing devices.

Fig. 7 is a partial perspective view showing the pivot between the pivotable rear portion of the hold floor and the fixed rear part of this floor.

Fig. 8 is a vertical section to a larger scale than Fig. 6 of this pivot.

Fig. 11 is a diagrammatic cross-section on line 11—11 of Fig. 12 of another modification.

Fig. 12 is a longitudinal section on line 12—12 of Fig. 11.

Figure 13:
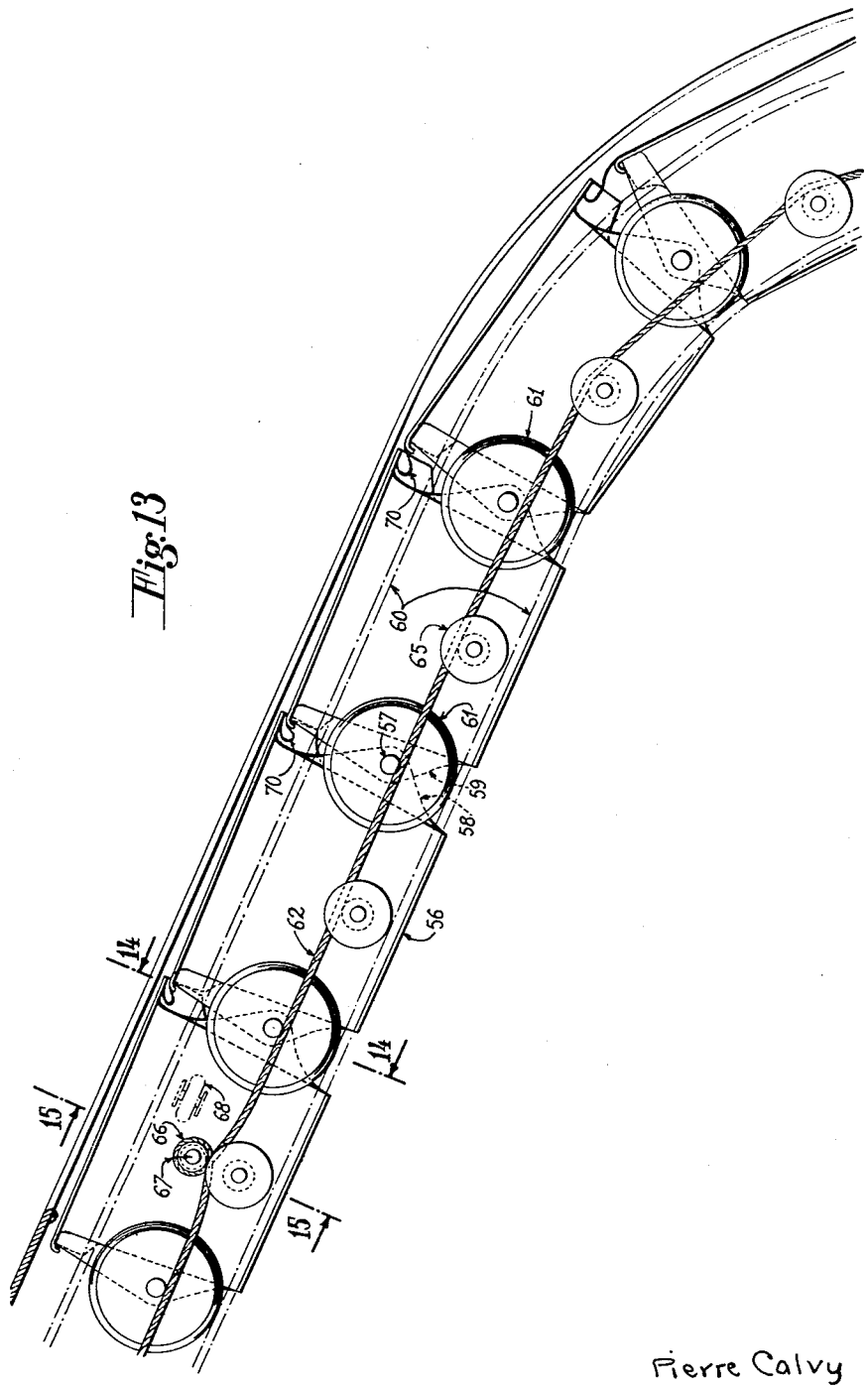
Fig. 13 is a partial longitudinal section, to a large scale, of the retractable box having jointed box section members for the closing of the hold of the example represented in Figs. 11 and 12.

Figs. 14 and 15 are vertical half-sections on lines 14—14 and 15—15 of Fig. 13.

Figs. 16 and 17 represent diagrammatically in elevation two other types of flying machine capable of modification in accordance with the invention.

In the embodiment illustrated in Figs. 1 to 8, the invention is shown applied to a flying machine having a central fuselage 1, two wings 2 and two booms 3 longitudinally disposed on either side of the fuselage 1 as extension of the engine cowls 4; these booms 3 carry rear fins 5.

A longitudinally disposed hold 7 is provided in the fuselage 1 behind the pilot's cabin 6 (see in particular Fig. 2).

This hold is bounded by:

(a) A double upper wall or box section composed of an outer covering 8 and an inner ceiling $8^a$ which need not be included. The outer covering 8 is reinforced by metal sections and is terminated at the rear by a transversal edge 10 that is preferably rectilinear and perpendicular to the vertical, longitudinal plane of symmetry AA, although this edge 10 may, if need be, be arched and for example arranged as shown in dotted lines at $10^a$ in Fig. 4. The ceiling $8^a$ is terminated at the rear at 11 (Fig. 6) a certain distance in front of the rear edge 10 of the outer covering 8 so that an opening is formed between the edges 10 and 11 that provides access to the space 12 between the walls 8 and $8^a$.

(b) Two double walls or side box sections each one of which is composed of an outer covering 13 and an inner panel $13^a$. These walls 13 and $13^a$ are reinforced by metal sections 14 and 15 and rearwardly extend so as to meet and form the rear edges 16 of the side walls of the fuselage. These edges 16 have such contour as to prolong the aerodynamic longitudinal form of the fuselage as is shown in particular in Figs. 1 and 3.

(c) A lower wall or box section composed of an outer covering 17 and an inner floor $17^a$ connected together by metal sections 18. These walls 17 and $17^a$ terminate at 19 and $19^a$ (Figs. 2 and 6) on a plane which passes through and is perpendicular to the longitudinal plane of symmetry AA, and is a certain distance in front of the rear edge 10 of the upper covering 8 of the fuselage.

The four double walls described above determine with their rear edges 10, 16 and $19^a$ the opening through which the hold communicates with the outside. When viewed in elevation from the rear, this opening has a substantially rectangular shape and a section therethrough on a plane BB (Fig. 6) passing through the upper and lower edges 10 and $19^a$ is substantially rectangular in shape and of a size that corresponds substantially to the largest cross-section of the hold 7, so that the largest object the hold is able to receive may pass through said opening.

This opening may be closed by the combination of a lower closing panel P and an upper panel Q.

The lower panel P comprises a box section having an outer wall 20 and an inner wall $20^a$ connected together by metal sections 21. This box section is arranged to form a loading ramp at $P^1$ when the machine is on the ground (Figs. 4 and 6) and to extend rearwardly the floor of the fuselage when this panel P is in the raised position represented by full lines in Figs. 5 and 6.

This panel P is pivotably mounted on the rear edge of the fuselage floor about an axis CC by means of a hinge device shown in Figs. 7 and 8. The hinge device comprises at each end of the axis CC a pivot pin 22 disposed along this axis CC and journalled in extended portions of the inner side walls of the fuselage, and a certain number of intermediary guiding means each one of which includes a roller 23 whose axis 24 is supported by a member 25 secured to the end of the panel P. This roller 23 is adapted to roll along a curved elongated hole 26 concentric with the axis CC and located in another member 27 connecting the walls 17 and 17$^a$ of the hold floor. This hinge arrangement avoids any projection of the hinges from the inner walls 17$^a$ and 20$^a$ of the floor and ramp P. The space between the two walls 17$^a$ and 20$^a$ is spanned by a metal band provided with a transversal groove 29 concentric with the axis CC and which permits the deformation of this band 28 as the panel P is pivoted.

The panel P is pivoted with the aid of two hydraulic jacks 30 housed in the double side walls of the fuselage. One of the elements of each jack is joined at 31 to the inner wall 13$^a$, and the other element is jointed at 32 to the panel P forming the ramp P. When these jacks are contracted they hold the inner wall 20$^a$ of the ramp P against the lower face of the extensions of the side walls of the fuselage.

The second closing panel Q comprises a metal wall 33 so arched as to prolong in its active position the outer covering 8 of the top of the fuselage. This wall 33 is reinforced by a certain number of internal ribs 34.

The panel Q is adapted to be retracted to Q$^1$ inside the chamber 12 within the upper double wall 8—8$^a$ of the fuselage. The panel is guided between the positions Q and Q$^1$ by means of two sets of two side runways 35 and 36 which are provided on the extensions of the side walls 13$^a$ and in each one of which is adapted to roll a roller 37 or 38 carried by one of the side ribs 34 reinforcing the wall 33.

The panel Q is displaced by means of two endless members each one of which is composed of a flexible cable 39 (Fig. 6) and a chain 40 connected together at 41 and 42. For all positions of the panel Q, the cable 39 passes over the return pulley 43 carried by the corresponding side wall 13$^a$ and disposed adjacent the end 10 of the top of the fuselage, and the chain 40 is in engagement with a sprocket 44. The cable 39 is fixed to the axis of the roller 38. Thus, when the chain 36 moves in the direction of the arrow $f^1$ (Fig. 6), the closing panel Q is moved from the closed position to the retracted position Q$^1$. For moving the chains and in consequence the cable 39, the two sprockets 44 are keyed to a horizontal transversal shaft 45. This shaft carries a gear wheel 46 in mesh with a worm 47 driven by an electric motor and/or any other drive means such as a crank 48$^a$ arranged in parallel with said motor thereby permitting the panel Q to be operated if necessary directly from the inside of the hold 7.

The opening and closing of the hold entrance is effected in the following way. When the flying machine is on the ground and is to be loaded, the ramp constituted by the panel P is lowered by means of the jacks 30 and the upper closing panel is slid back to Q$^1$.

The machine may now be very easily loaded. To close the hold completely, it suffices to raise the loading ramp to its position at P and to return the panel to its position at Q.

If all or part of the hold contents is to be jettisoned in flight the hold may be easily opened by means of sliding back the upper panel Q to its position at Q$^1$.

The described arrangement possesses considerable advantages. The opening of the hold does not comprise any side closing member which projects outwardly in the open position and which would be subjected to the action of the wind during the jettisoning of the freight to the ground.

It is unnecessary to wait until the panels P and Q are closed before starting the motors of the flying machine which is necessary when the opening comprises doors that project from the sides. Thus precious time is saved in taking off.

Further, for parachuting objects, it is unnecessary to provide jettison doors other than that for loading. In known arrangements the doors provided at the rear open sideways and cannot in any circumstance be opened during flight due to the relative wind. As the panel Q does not project outwardly in any way, its opening is in no way affected by the speed of the flying machine.

There is therefore no need to provide special jettison trap doors, which in the case of the parachuting of large objects do not allow of an easy casting off. Neither is it necessary to fly with the hold open at the rear, which would cause a decrease in the power of the machine during flight and necessitate a crew on the ground for the dismantling of the doors before loading when these doors have to be removed to allow a jettisoning in flight.

Finally, it is evident that the described arrangement is adaptable, without difficulty, on cargo-planes having a very large hold as well as on any other aircraft normal shape.

Figure 10:
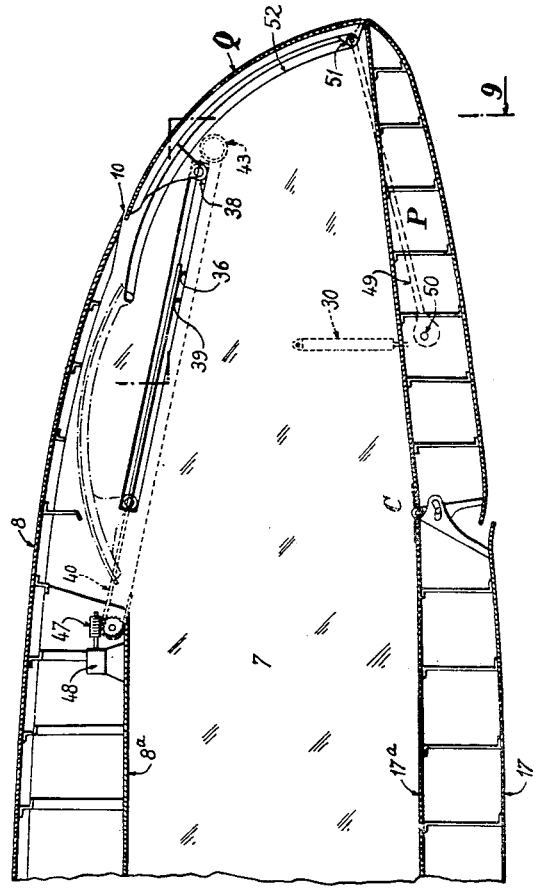
Fig. 10 is a longitudinal section of the rear part of the fuselage of this modification.
Figure 9:
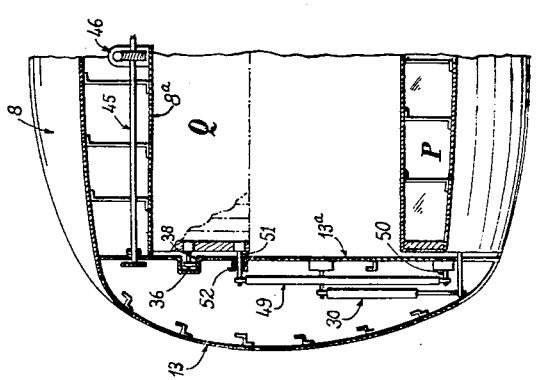
Fig. 9 is a cross-section on line 9—9 of Fig. 10 of a first modification.

Figs. 9 and 10 show another example according to which there is provided on each side of the fuselage a guiding device constituted by a connecting rod 49 housed in the corresponding side box section. This connecting rod is pivotably mounted at 50 about a fixed axis carried by the inner side wall 13$^a$ and at the other end about a spindle 51 on the closing panel Q. This spindle 51 passes freely through the slot 52 having a shape in the form of an arc of a circle with a centre coinciding with the pivot axis 50 of the connecting rod 49 and housed in said wall 13$^a$.

The other end of the panel Q is guided as in the preceding example by two rollers 38 each one of which moves in a rectilinear runway 36. The panel Q may be moved as in the preceding example by means of the motor 48 through the gear 47 and the two endless side members each one of which is composed of a chain 40 and a cable 39 passing over a return pulley 43 carried by the corresponding side panel.

The lower panel P forming the entrance ramp is not controlled by this drive device but is operated by the two side jacks 30 as in the examples in Figs. 5 and 6.

Another modification is illustrated in Figs. 11 to 15 in which the floor 17, 17$^a$ is not provided with the rear ramp P of the other examples. The opening between the rear edge 10 of the outer wall 8 of the top and the rear edge 19$^a$ of the inner wall 17$^a$ of the floor is closed by a jointed blind or screen. This screen is composed of a certain number of transversally disposed box sections 56 (see in particular Fig. 13) jointed together about axes, such as shown at 57 which are passed through twin pieces 58 and 59 secured to the side box sections.

This blind may be either drawn across the opening so that its contour corresponds to that of the rear extensions of the side walls 13—13$^a$ or withdrawn into the box section 8—8$^a$ constituting the top of the fuselage. It is guided inside runways 60 in which run rollers such as is shown at 61 (see in particular Figs. 13 and 14). These rollers 61 are disposed on axes 57 about which the box sections 56 are pivotably assembled.

The blind is moved with the aid of two laterally disposed cables 62. The two ends of each cable are wound round an upper drum 63 and a lower drum 64 (see Fig. 12) that are driven in rotation by motors 63$^a$ and 64$^a$. The cable passes over guide pulleys 65 disposed in the U-section channel constituting the runway 60, and is secured to the first top box section of the blind by a loop 66 (Fig. 13) formed round a stud 67 fixed on this first box section 56.

It will be observed that the blind is guided in the transverse direction by rollers 68 (see Figs. 13 and 14) carried by forks 69 secured to the box sections 56. These rollers roll along the inner faces of the webs of the U-section channels 60 that constitute the runways.

It will also be observed that the sealing between the successive elements 56 of the blind is obtained by rubberized bands 70 (Figs. 13 and 14) adhered to the adjacent edges of the box sections. Lastly, the sealing between the blind and the side walls of the fuselage is achieved by means of hollow piping 71 (Figs. 14 and 15) in an elastic material such as rubber fixed to the pieces 72 connecting the outer walls 13 to the guide 60. This piping 71 is in contact with the end faces of the box sections 56.

Naturally, the various examples hereinbefore described may be applied to any type of flying machine, such as the twin boom type illustrated in Fig. 1, or the normal type illustrated in Fig. 16 which comprises two wings 72 and a tail unit 73 disposed above the fuselage hold 74, or the type illustrated in Fig. 17 in which a single boom 75 is let into the upper part of the fuselage hold 76, or indeed any type of flying machine such as for example sea planes, helicopters, and flying machines for the transport of freight the service requirements of which correspond to those enumerated in the preamble.

The invention is not limited to the details of construction hereinbefore described and illustrated, which have been given solely by way of example.

Having now described my invention what I claim as new and desire to secure by Letters Patent is:

1. In a flying machine for the transport of freight and large objects that may be jettisoned in flight: a fuselage which comprises a hold and is composed of four double walls forming a floor, two longitudinally disposed side walls and a ceiling, and is provided at the rear with an opening having a substantially rectangular shape and a clearance area substantially equal to the largest cross-section of said hold, closing means for this opening, at least a portion of said means including a rigid and retractable panel that is mobile between an active position wherein it closes said opening and a retracted position within the double wall constituting said ceiling, two guiding means supported by each of said double walls forming the side walls of the fuselage and adapted to so guide this rigid and retractable panel that it never projects outside of the fuselage, and actuating means provided within the double walls of the fuselage for moving said rigid retractable panel between its active position and its retracted position.

2. In a flying machine for the transport of freight and large objects that may be jettisoned in flight: a fuselage which comprises a hold and is composed of four double walls forming a floor, two longitudinally disposed side walls and a ceiling, and is provided at the rear with an opening having a substantially rectangular shape and a clearance area substantially equal to the largest cross-section of said hold, closing means for this opening, at least a portion of said means including a rigid and retractable panel that is mobile between an active position wherein it closes said opening and a retracted position within the double wall constituting said ceiling, two guiding means supported by each of said double walls forming the side walls of the fuselage and adapted to so guide this rigid and retractable panel that it never projects outside of the fuselage, and actuating means provided within the double walls of the fuselage for moving said retractable panel between its active position and its retracted position, said actuating means comprising: a drive mechanism disposed in the double walled ceiling, and attached to the inner wall of said ceiling a transversally disposed shaft driven by this mechanism, two chain sprockets keyed to this shaft disposed within each of said double walls forming the side walls of the fuselage, and for each sprocket a chain in engagement with said sprocket, a cable secured to the two ends of this chain to form therewith a flexible endless coupling inside the corresponding side wall, this cable being fixed at one point along its length to the retractable panel, and a return pulley supported on said side wall and around which said cable is passed.

3. In a flying machine for the transport of freight and large objects that may be jettisoned in flight: a fuselage which comprises a hold and is composed of four walls forming a floor, two longitudinally disposed side walls and a ceiling, and is provided at the rear with an opening having a substantially rectangular shape and a clearance area substantially equal to the largest cross-section of said hold, closing means for this opening, said closing means being composed of the combination of a rigid and retractable panel that is mobile between an active position wherein it closes said opening and a retracted position below said ceiling, and a swingable panel hinged to the rear transversal edge of said floor and adapted to occupy two positions in one of which it is raised and is in contact with the retractable panel when the latter is in its active closing position, and in the other it is lowered and slopes down from the end adjacent the hinge point towards its extreme rear edge thereby forming a hold loading and unloading ramp when the flying machine is on the ground, the hinging of said swingable panel on the rear edge of the floor being composed of two laterally disposed hinges and at least one intermediary guiding means comprising a roller supported by one of the two parts (floor and panel) that are mobile with respect to each other, and a runway along which said roller is adapted to roll, this runway being shaped in the form of an arc of a circle and having its centre on the hinge axis of the swingable panel and being fixed to the other of said parts; runways supported by said side walls of the fuselage for guiding said retractable panel so that it never projects outside of said fuselage; shifting means for moving said retractable panel between its two positions, and actuating means for swinging said swingable panel in either direction.

References Cited in the file of this patent

UNITED STATES PATENTS

| | | |
|---|---|---|
| 2,095,440 | Hojnowski | Oct. 12, 1937 |
| 2,315,117 | Freytag | Mar. 30, 1943 |
| 2,378,856 | Laddon et al. | June 19, 1945 |
| 2,425,499 | Watter | Aug. 12, 1947 |
| 2,689,696 | Gannon | Sept. 21, 1954 |